(12) United States Patent
Horimizu

(10) Patent No.: US 9,840,402 B2
(45) Date of Patent: Dec. 12, 2017

(54) LIFT DEVICE FOR VEHICLE

(71) Applicant: YASUI CORPORATION, Fujinomiya-shi, Shizuoka (JP)

(72) Inventor: Toshihide Horimizu, Fujinomiya (JP)

(73) Assignee: YASUI CORPORATION, Fujinomiya-shi, Shizuoka (JP)

( * ) Notice: Subject to any disclaimer, the term of this patent is extended or adjusted under 35 U.S.C. 154(b) by 0 days.

(21) Appl. No.: 15/309,798

(22) PCT Filed: Jun. 5, 2015

(86) PCT No.: PCT/JP2015/066413
§ 371 (c)(1),
(2) Date: Jul. 24, 2017

(87) PCT Pub. No.: WO2015/194404
PCT Pub. Date: Dec. 23, 2015

(65) Prior Publication Data
US 2017/0313561 A1    Nov. 2, 2017

(30) Foreign Application Priority Data

Jun. 19, 2014 (JP) .................................. 2014-126735
Aug. 26, 2014 (JP) .................................. 2014-172024

(51) Int. Cl.
*B66F 7/28* (2006.01)
*B66F 7/10* (2006.01)
*B66F 3/46* (2006.01)

(52) U.S. Cl.
CPC ................ *B66F 7/28* (2013.01); *B66F 3/46* (2013.01); *B66F 7/10* (2013.01); *B66F 2700/123* (2013.01)

(58) Field of Classification Search
CPC ........ B66F 7/10; B66F 7/28; B66F 7/04; B66F 7/20; B66F 7/02; B66F 3/46
See application file for complete search history.

(56) References Cited

U.S. PATENT DOCUMENTS 3,837,435 A * 9/1974 Pelouch ................ B66F 7/0625
                                                                    187/211
4,212,449 A * 7/1980 Tsujimura ................ B66F 7/04
                                                                    187/213
(Continued)

FOREIGN PATENT DOCUMENTS

CN       1835863 A     9/2006
CN     103521381 A     1/2014
(Continued)

*Primary Examiner* — Michael A Riegelman
(74) *Attorney, Agent, or Firm* — Typha IP LLC

(57) ABSTRACT

In a vehicle lift device (100) including a pair of right and left lifting frames (10) installed on right and left sides of a maintenance work area (A) of a vehicle to be serviced (1), and a pair of front and rear swing arms (20, 50) supported at two respective front and rear positions of a lifting platform (11) included in each of the lifting frames (10), and allowed to be lifted and lowered along with the lifting platform (11), each of the swing arms (20, 50) includes a link coupling body (20A, 50A) obtained by connecting a plurality of links, a base link (21, 51) included in the link coupling body (20A, 50A) is fixed to the lifting platform (11) of the lifting frame (10), and a distal link (22, 52) included in the link coupling body (20, 50A) includes a vehicle holding tool (30, 60).

13 Claims, 12 Drawing Sheets

(56) References Cited

U.S. PATENT DOCUMENTS

| | | | | |
|---|---|---|---|---|
| 4,679,660 | A * | 7/1987 | Suzuki | B66F 7/02 187/219 |
| 4,825,977 | A * | 5/1989 | Isogai | B66F 7/02 187/203 |
| 4,934,487 | A * | 6/1990 | Isogai | B66F 7/04 187/213 |
| 5,009,287 | A * | 4/1991 | Starr | B66F 7/04 187/213 |
| 5,954,160 | A * | 9/1999 | Wells, Sr. | B66F 7/04 187/203 |
| 6,279,685 | B1 * | 8/2001 | Kogan | B66F 7/20 187/203 |
| 7,461,733 | B2 | 12/2008 | Dohi | |
| 2006/0219525 | A1 * | 10/2006 | Dohi | B62D 65/18 198/685 |
| 2010/0108445 | A1 * | 5/2010 | Kritzer | B66F 3/46 187/218 |
| 2016/0039647 | A1 * | 2/2016 | Katerberg | B66F 7/20 254/93 L |

FOREIGN PATENT DOCUMENTS

| | | | |
|---|---|---|---|
| JP | 46-42728 | B1 | 12/1971 |
| JP | 53-5619 | A | 1/1978 |
| JP | 53-33177 | B2 | 9/1978 |
| JP | 55-11119 | B2 | 3/1980 |
| JP | 59-8575 | B2 | 2/1984 |
| JP | 62-70066 | U1 | 5/1987 |
| JP | 7-5099 | Y2 | 2/1995 |
| JP | 2002-128482 | A | 5/2002 |

* cited by examiner

LIFT DEVICE FOR VEHICLE

TECHNICAL FIELD

The present invention relates to a vehicle lift device.

BACKGROUND ART

As described in Patent Literature 1, there is a conventional vehicle lift device which includes a pair of right and left lifting frames installed on right and left sides of a maintenance work area of a vehicle to be serviced, and a pair of front and rear sliding arms which is supported at two front and rear positions of a lifting platform included in each of the lifting frames and can be lifted along with the lifting platform.

Each of the sliding arms employed in the vehicle lift device described in Patent Literature 1 has a proximal arm having a rectangular cross section pivoted around a spindle provided in the lifting platform of each of the lifting frames, an intermediate arm having a rectangular cross section inserted into the rectangular cross section of the proximal arm in an extendable and retractable manner, and a distal arm having a rectangular cross section inserted into the rectangular cross section of the intermediate arm in an extendable and retractable manner. Further, the sliding arm includes a bracket in the distal arm.

Referring to each of the sliding arms, the proximal arm is rotated around the spindle of the lifting platform, the sliding arm is extended and retracted by straightly sliding the respective arms corresponding to the proximal arm, the intermediate arm, and the distal arm, and the bracket included in the distal arm can be positioned at a lift point determined in a lower part of a vehicle. In this state, the vehicle can be lifted up by lifting the sliding arms along with the respective lifting platforms.

CITATION LIST

Patent Literature

Patent Literature 1: JP 2002-128482 A

SUMMARY OF THE INVENTION

Technical Problem

The vehicle lift device disclosed in Patent Literature 1 has the following problems.

(1) The sliding arm is extended and retracted by straightly sliding the respective arms corresponding to the proximal arm, the intermediate arm, and the distal arm. In addition, when the bracket included in the distal arm is positioned at the lift point in the lower part of the vehicle, the respective arms need to be slid toward and inserted into the lower part of the vehicle on a straight line connecting the spindle provided in the lifting platform of the lifting frame and the lift point in the lower part of the vehicle (on a straight line obliquely crossing a front-rear direction of the vehicle). For this reason, when a plurality of arms including the distal arm of the sliding arm is inserted into the lower part of the vehicle, if the vehicle has a low height and a wide width, there is concern that the plurality of arms touches a vehicle body, and thus the bracket may not be positioned at the lift point in the lower part of the vehicle.

(2) In the sliding arm, the intermediate arm is inserted into the rectangular cross section of the proximal arm, and the distal arm is inserted into the rectangular cross section of the intermediate arm. Further, a contact area associated with sliding of the respective arms is large. Therefore, the respective arms are slid while an arm weight on a distal side is applied to a contact surface between arms, and a large operating force is needed.

(3) In the sliding arm, the intermediate arm is inserted into the rectangular cross section of the proximal arm, and the distal arm is inserted into the rectangular cross section of the intermediate arm. Further, the intermediate arm and the distal arm having small areas are inserted in order into the proximal arm having a large area such that the intermediate arm and the distal arm are stored inside the proximal arm. Thus, each of the arms needs to have cross section dimensions and a plate thickness for ensuring certain strength, and there is difficulty in miniaturization.

(4) In the sliding arm, a weight of the vehicle at the time of lifting up the vehicle acts on contact surfaces of the respective arms, and free sliding thereof is inhibited. Free extending and retracting of the sliding arm cannot be easily and reliably locked.

(5) In the vehicle lift device described in Patent Literature 1, an operation of aligning the bracket provided in the distal arm of each of the sliding arms to the lift point provided in the lower part of the vehicle is difficult since the dark lower part in the vehicle needs to be looked into in order to search for the lift point. At the same time, the operation entails a difficult work posture in which a head is lowered.

In addition, in a recent vehicle including aero parts such as a side skirt in a side portion of the vehicle, the aero parts make it more difficult to find the lift point in the lower part of the vehicle, and make the operation of aligning the bracket to the lift point more difficult.

A subject of the invention is to provide a vehicle lift device capable of easily inserting a vehicle holding tool into a lower portion of a low floor vehicle with a small operating force.

Another subject of the invention is to attempt miniaturization of a swing arm including a vehicle holding tool in a vehicle lift device.

Another subject of the invention is to allow a swing arm including a vehicle holding tool to be easily and reliably locked in a vehicle lift device.

Another subject of the invention is to easily lift up a vehicle by a vehicle holding tool when the vehicle holding tool is provided at a distal portion of each arm supported by each lifting platform which is included in a pair of right and left lifting frames of a vehicle lift device.

Solution to Problem

In accordance with claim 1 of the present invention, there is provided a vehicle lift device comprising:

a pair of right and left lifting frames installed on right and left sides of a maintenance work area of a vehicle to be serviced; and a pair of front and rear swing arms supported at two respective front and rear positions of a lifting platform included in each of the lifting frames, and allowed to be lifted and lowered along with the lifting platform, wherein each of the swing arms includes a link coupling body obtained by connecting a plurality of links, a base link included in the link coupling body is fixed to the lifting platform of the lifting frame, and a distal link included in the link coupling body includes a vehicle holding tool.

In accordance with claim 2 of the present invention, in the vehicle lift device according to claim 1, wherein the link coupling body includes seven links corresponding to a base link, a distal link, an intermediate link, a first link, a second link, a first sub-link, and a second sub-link, lengths of respective links corresponding to the base link, the distal link, and the intermediate link are identical to one another, lengths of respective links corresponding to the first link and the first sub-link are identical to each other, and lengths of respective links corresponding to the second link and the second sub-link are identical to each other, and the base link, the first link, the intermediate link, and the first sub-link are connected to form a first parallelogram link mechanism, and the intermediate link, the second link, the distal link, and the second sub-link are connected to form a second parallelogram link mechanism.

In accordance with claim 3 of the present invention, in the vehicle lift device according to claim 2, wherein the link coupling body includes an arm locking means that locks free displacement of the first parallelogram link mechanism, and locks free displacement of the second parallelogram link mechanism.

In accordance with claim 4 of the present invention, in the vehicle lift device according to claim 3, wherein the arm locking means allows a first stopping part provided to be able to advance and retreat with respect to the second sub-link to be engaged with a first engaging part fixedly provided in the first sub-link, and allows a second stopping part provided to be able to advance and retreat with respect to the second sub-link to be engaged with a second engaging part fixedly provided in the intermediate link, and the first stopping part is engaged with the first engaging part, and the second stopping part is engaged with the second engaging part by a lock operation part provided in the second sub-link, thereby allowing the free displacement of the first parallelogram link mechanism and the free displacement of the second parallelogram link mechanism to be simultaneously locked.

In accordance with claim 5 of the present invention, in the vehicle lift device according to any one of claims 1 to 4, wherein the distal link of the link coupling body includes the vehicle holding tool allowed to be shifted only in a longitudinal direction and a vehicle width direction of the vehicle, the vehicle holding tool coming into contact with two front and rear positions in a lower part of a tire of the vehicle.

In accordance with claim 6 of the present invention, in the vehicle lift device according to any one of claims 1 to 5, wherein the vehicle holding tool included in the distal link of the link coupling body includes front and rear levers coming into contact with the two respective front and rear positions in the lower part of the tire of the vehicle from below.

In accordance with claim 7 of the present invention, in the vehicle lift device according to any one of claims 1 to 5, wherein the vehicle holding tool included in the distal link of the link coupling body includes a bracket coming into contact with a lift point determined in the lower part of the vehicle from below.

EFFECTS (Claim 1)

(a) The swing arm (the swing arm is substantially the same) swings to assign a free trajectory to the vehicle holding tool included in the distal link through rotation of the plurality of links included in the link coupling body, and thus the vehicle holding tool may be positioned at the lift arrangement portion determined in the lower part of the vehicle (the two front and rear positions in the lower part of the tires of the vehicle, or a lift point determined in the lower part of the vehicle). Therefore, when the swing arm is swung by assigning appropriate rotation angles to the respective links, the distal link is shifted toward the vehicle, and at least links on a distal side (the distal link and the intermediate link) except for the base link in the link coupling body and the vehicle holding tool included in the distal link may be inserted into the lower part of the vehicle. Alternatively, only the vehicle holding tool included in the distal link may be inserted into the lower part of the vehicle. In this way, even when the vehicle has a low height and a wide width, the vehicle may be lifted up by positioning the vehicle holding tool at the lift arrangement portion determined in the lower part of the vehicle without the base link or the respective links including the base link touching a vehicle body.

(b) The respective links included in the link coupling body are pivotably supported by the connecting shafts, and the respective links are rotated around the connecting shafts, thereby allowing the swing arm to swing. Further, a contact area associated with rotation of the respective links is small. Therefore, the swing arm may be swung at a small operating force, and the vehicle holding tool may be easily inserted into the lift arrangement portion determined in the lower part of the vehicle.

(c) In the swing arm, the respective links are connected through the connecting shafts and included in the link coupling body, and one link is not stored inside a cross section of another link. In this way, certain strengths may be ensured in the respective links while reducing cross section dimensions of the respective links. In addition, strength against torsion may be ensured by configuring the respective links using round pipes. Therefore, it is possible to attempt miniaturization of the swing arm including the vehicle holding tool.

(Claim 2)

(d) The link coupling body included in the swing arm is configured to have the first parallelogram link mechanism and the second parallelogram link mechanism, the intermediate link of the first parallelogram link mechanism and the intermediate link of the second parallelogram link mechanism are in common, the base link of the first parallelogram link mechanism is fixed to the lifting platform of the lifting frame, and the vehicle holding tool is included in the distal link of the second parallelogram link. In this way, irrespective of a form in which the swing arm swings, the distal link including in the vehicle holding tool moves in parallel to the base link fixed to the lifting platform of the lifting frame. Therefore, when the direction of the vehicle holding tool included in the distal link is previously arranged to be parallel or perpendicular to the longitudinal direction of the vehicle (the front-rear direction of the vehicle) stopped at the maintenance work position of the maintenance work area, the vehicle holding tool is shifted only in the longitudinal direction and the vehicle width direction of the vehicle irrespective of the form in which the swing arm swings. For example, when the swing arm is swung at a manual operating force of an operator who holds the distal link, the vehicle holding tool is easily positioned at an appropriate position along the longitudinal direction of the vehicle, and is easily positioned at an appropriate position along the vehicle width direction of the vehicle. As a result, the vehicle holding tool may be reliably and easily positioned at a lift arrangement portion determined in the lower part of the vehicle.

(Claim 3)

(e) The link coupling body included in the swing arm has an arm locking means that locks free displacement of the first parallelogram link mechanism and locks free displacement of the second parallelogram link mechanism. In this way, when the vehicle holding tool included in the distal link of the swing arm is positioned at the lift arrangement portion determined in the lower part of the vehicle, the arm locking means locks free displacements of the first parallelogram link mechanism and the second parallelogram link mechanism. As a result, free swing of the swing arm may be easily and reliably locked, and the vehicle holding tool may be easily fixed to the lift arrangement portion determined in the lower part of the vehicle.

(Claim 4)

(f) The arm locking means allows the first stopping part provided to be able to advance and retreat with respect to the second sub-link and the first engaging part fixedly provided in the first sub-link to be engaged with each other, and allows the second stopping part provided to be able to advance and retreat with respect to the second sub-link and the second engaging part fixedly provided in the intermediate link to be engaged with each other. Further, the first stopping part is engaged with the first engaging part, and the second stopping part is engaged with the second engaging part using the lock operation part provided in the second sub-link, thereby allowing free displacement of the first parallelogram link mechanism and free displacement of the second parallelogram link mechanism to be simultaneously locked. In this way, free displacements of the first parallelogram link mechanism and the second parallelogram link mechanism may be simultaneously locked by a compact structure irrespective of a position at which the swing arm swings. In addition, free displacements of the first parallelogram link mechanism and the second parallelogram link mechanism may be easily and simultaneously locked through a simple operation of rotating the cam surface using the single lock operation part.

(Claim 5)

(g) The distal portion of each arm supported by the lifting platform included in each of the right and left lifting frames is shifted only in the longitudinal direction and the vehicle width direction of the vehicle. Therefore, each vehicle holding tool included in the distal portion of each arm is moved in the longitudinal direction of the vehicle, is positioned at a side of each tire determined according to a wheelbase of the vehicle, and then is shifted in the vehicle width direction, thereby being rapidly positioned below the two front and rear positions in the lower part of each tire. Thereafter, when each arm is lifted in a synchronized manner, each vehicle holding tool comes into contact with the two front and rear positions in the lower part of each tire, and is allowed to lift up the whole vehicle by interposing each tire from the front and the rear.

The operator may easily align each vehicle holding tool to the two front and rear positions in the lower part of each tire from a side of the vehicle and easily lift up the vehicle without the need to look into the dark lower part of the vehicle or take a difficult operation posture in which the head is lowered in order to search for the lift point in the lower part of the vehicle.

(h) When the lifting frame that supports each arm is fixedly installed in the maintenance work area, a portion coming into contact with each tire of each vehicle holding tool provided in the distal portion of each arm may be stably set in a horizontal position. Therefore, even when a drainage slope is present on the floor of the maintenance work area, each vehicle holding tool may stably lift up the whole vehicle by interposing each tire from the front and the rear without a concern about forward tilting along the drainage slope.

(i) When each vehicle holding tool included in the distal portion of each arm is correctly shifted in the vehicle width direction, the front and rear levers included in the vehicle holding tool may be correctly set to be parallel to two front and rear surfaces of each tire and come into contact with the two front and rear surfaces, and each tire may be stably interposed between the front and rear levers of the vehicle holding tool, thereby stably lifting up the whole vehicle.

On the other hand, when the front and rear levers of each vehicle holding tool are set at positions obliquely crossing the two front and rear surfaces of each tire, only an edge portion of each tire in a width direction comes into contact with each lever, and a length in which each tire touches each lever is small. Thus, there is a concern that each tire is unstably interposed between the front and rear levers, or the tire, a steering angle of which is not locked, rotates in a steering direction with respect to the front and rear levers, and each tire falls off the front and rear levers during lifting-up.

(j) Each vehicle holding tool is applicable to the tire having various sizes by allowing an interval, at which the front and rear levers are installed, to be variable.

(Claim 6)

(k) The vehicle holding tool included in the distal link of the link coupling body which is included in the swing arm consists of the front and rear levers coming into contact with the two respective front and rear positions from below in the lower part of the tire of the vehicle. The vehicle lift device of the invention may shift the distal link in the vehicle width direction from the outside of the vehicle by swinging the swing arm. Thus, the front and rear levers of the vehicle holding tool included in the distal link may be allowed to enter in the vehicle width direction from a side of the lower part of the tire, and the two front and rear positions in the lower part of the tire may be interposed between the two levers, thereby performing lifting. There is no need to search for the lift point by looking into the lower part of the vehicle in order to align the vehicle holding tool to the lift point determined in the lower part of the vehicle.

(Claim 7)

(l) The vehicle holding tool included in the distal link of the link coupling body which is included in the swing arm is a bracket coming into contact with the lift point determined in the lower part of the vehicle from below. In the vehicle lift device of the invention, even when the vehicle has a low height and a wide width, the vehicle holding tool is positioned by being inserted into the lower part of the vehicle, and thus the bracket of the vehicle holding tool is reliably and easily positioned at the lift point in the lower part of the vehicle, thereby performing lifting.

DESCRIPTION OF EMBODIMENTS

Embodiment (FIG. 1 to FIG. 8)

Figure 1:
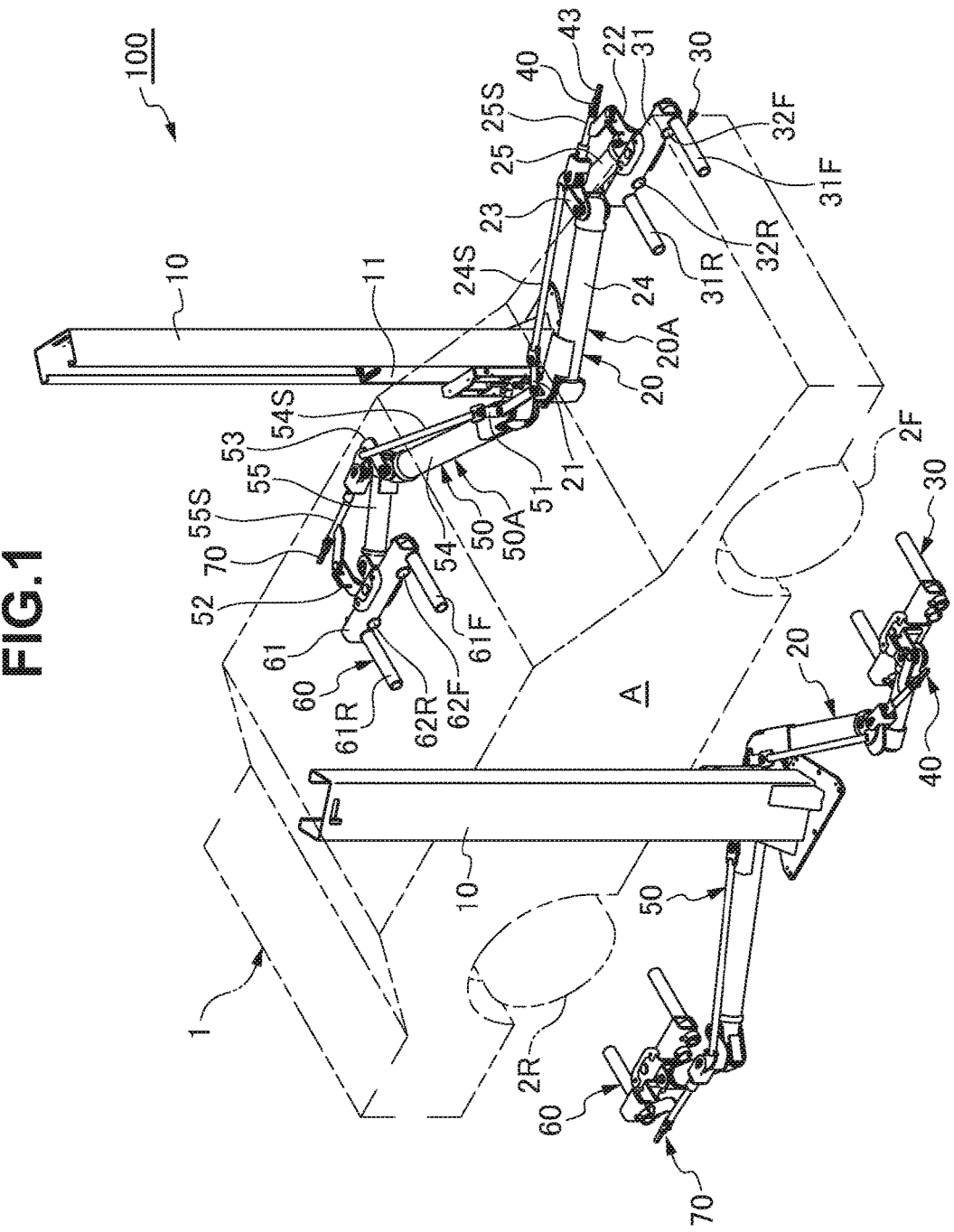
FIG. 1 is a schematic diagram illustrating a vehicle lift device of an embodiment.
Figure 2:
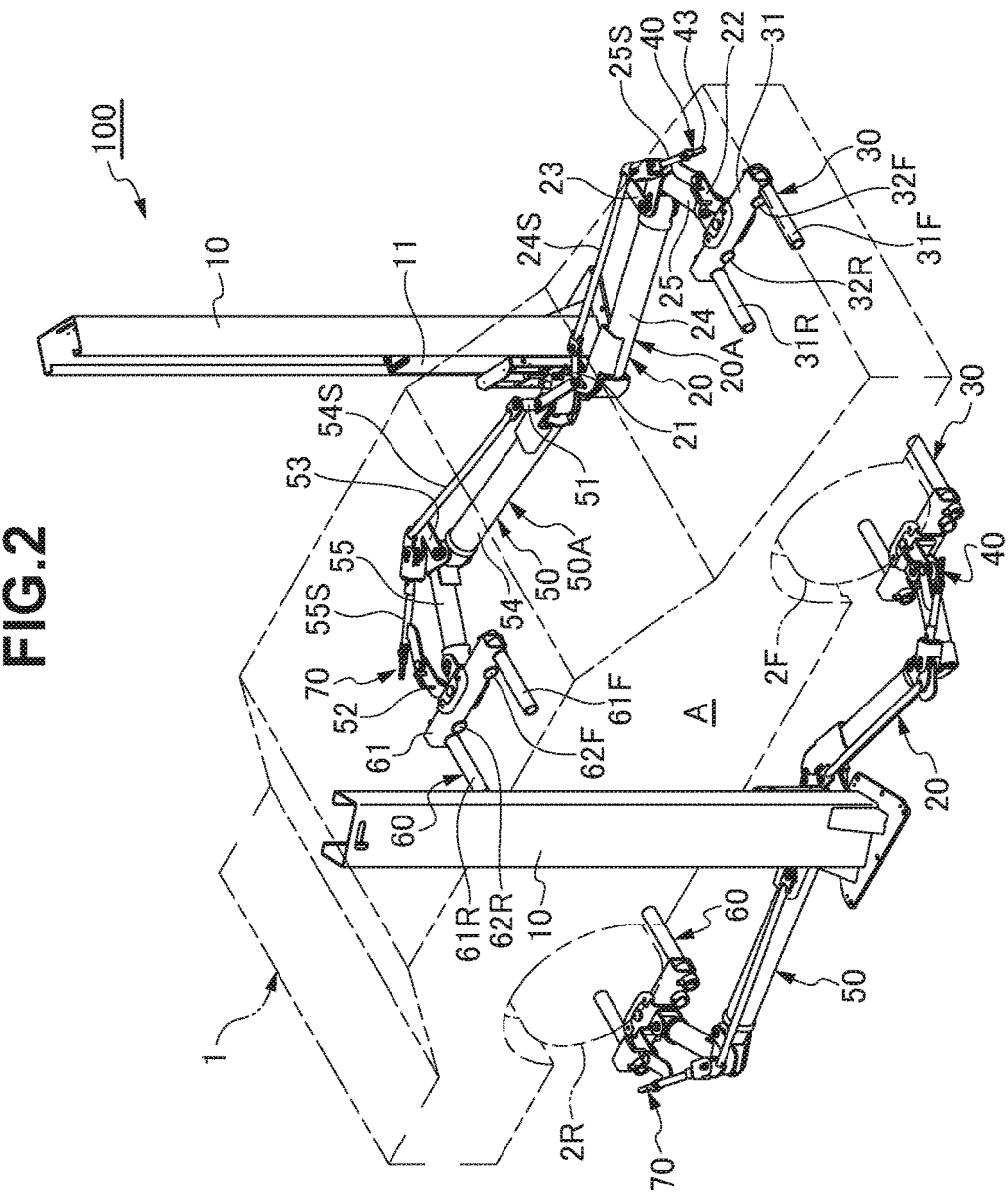
FIG. 2 is a schematic diagram illustrating a lift-up start step of the vehicle lift device.
Figure 3:
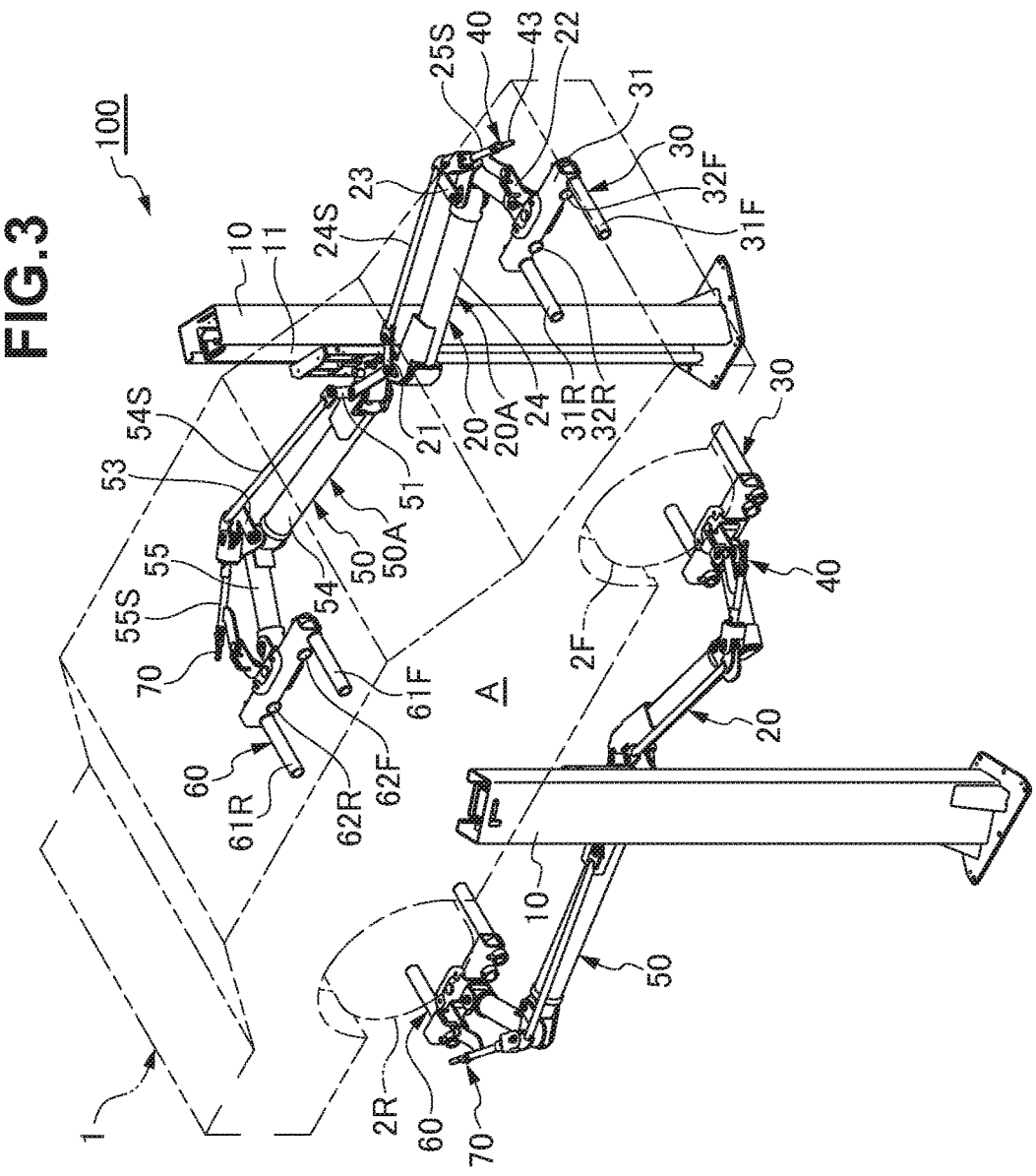
FIG. 3 is a schematic diagram illustrating a lift-up completed step of the vehicle lift device.

A vehicle lift device 100 illustrated in FIG. 1 to FIG. 3 includes a pair of right and left lifting frames 10 and 10 installed on right and left sides of a maintenance work area A which includes a maintenance work position at which a vehicle subjected to maintenance 1 is introduced and stopped. Each lifting frame 10 is fixedly vertically arranged on a floor of the maintenance work area A by an anchor bolt, etc. implanted in the floor, and includes a lifting platform 11 which is lifted and lowered by having a driving means (a hydraulic cylinder, an electric motor, etc.) (not illustrated). Note that a direction along a vehicle width direction perpendicular to a front-rear direction of the vehicle 1, which is introduced and stopped at the maintenance work position of the maintenance work area A, is set to a left-right direction.

The vehicle lift device 100 includes a pair of front and rear swing arms 20 and 50 supported at two front and rear positions of the lifting platform 11 which is included in each lifting frame 10. Each of the swing arms 20 and 50 can be lifted and lowered along with the lifting platform 11 when the lifting platform 11 is lifted and lowered. Note that a direction along a vehicle longitudinal direction along the front-rear direction of the vehicle 1, which is introduced and stopped at the maintenance work position of the maintenance work area A, is set to a front-rear direction.

Each swing arm 20 (50) consists of a link coupling body 20A (50A) obtained by connecting a plurality of links. A base link 21 (51) included in the link coupling body 20A (50A) is fixed to the lifting platform 11 of the lifting frame 10, and a distal link 22 (52) included in the link coupling body 20A (50A) includes a vehicle holding tool 30 (60).

Figure 4:
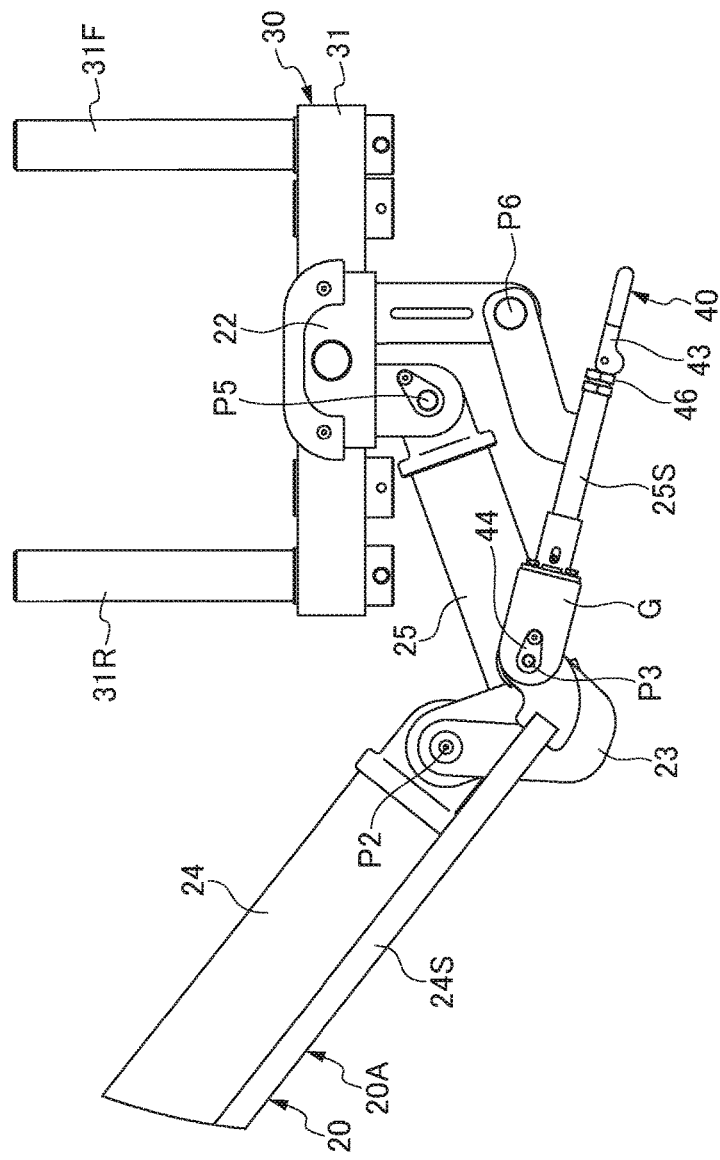
FIG. 4 is a plan view illustrating a swing arm.
Figure 5:
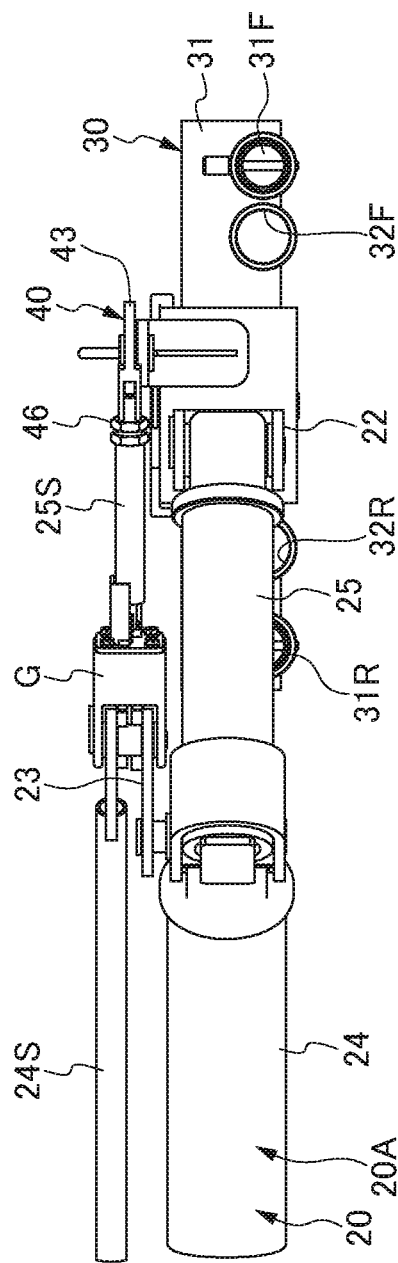
FIG. 5 is a side view illustrating the swing arm.

As illustrated in FIG. 4, the vehicle holding tool 30 (60) included in the distal link 22 (52) of the link coupling body 20A (50A) consists of a mounting bracket 31 (61) fixed to the distal link 22 (52), and front and rear levers 31F, 31R (61F, 61R) fixed by being inserted into mounting holes provided in the mounting bracket 31. The front and rear levers 31F, 31R (61F, 61R) consist of straight bar bodies having circular cross sections, and come into contact with two respective front and rear positions in a lower part (lower half portion) of a front tire 2F (a rear tire 2R) of the vehicle 1 from below. The mounting bracket 31 (61) has two or more mounting holes 32F (62F) for the front lever 31F (the front lever 61F) and two or more mounting holes 32R (62R) for the rear lever 31R (the rear lever 61R) in order to allow insertion positions of the levers 31F, 31R (61F, 61R) to be selected according to a tire diameter of the vehicle 1.

As illustrated in FIG. 1 and FIG. 4 to FIG. 6, the link coupling body 20A (50A) consists of seven links corresponding to a base link 21 (51), a distal link 22 (52), an intermediate link 23 (53), a first link 24 (54), a second link 25 (55), a first sub-link 24S (54S), and a second sub-link 25S (55S). Lengths of respective links corresponding to the base link 21 (51), the distal link 22 (52), and the intermediate link 23 (53) are identical to one another, lengths of respective links corresponding to the first link 24 (54) and the first sub-link 24S (54S) are identical to one another, and lengths of respective links corresponding to the second link 25 (55) and the second sub-link 25S (55S) are identical to one another. However, in order to prevent vibration, etc. at the time of lifting and lowering the swing arm 20 at a front side and the swing arm 50 at a rear side, the lengths of the first link 24 and the first sub-link 24S of the swing arm 20 are different from the lengths of the first link 54 and the first sub-link 54S of the swing arm 50, and the lengths of the second link 25 and the second sub-link 25S of the swing arm 20 are different from the lengths of the second link 55 and the second sub-link 55S of the swing arm 50.

Figure 6:
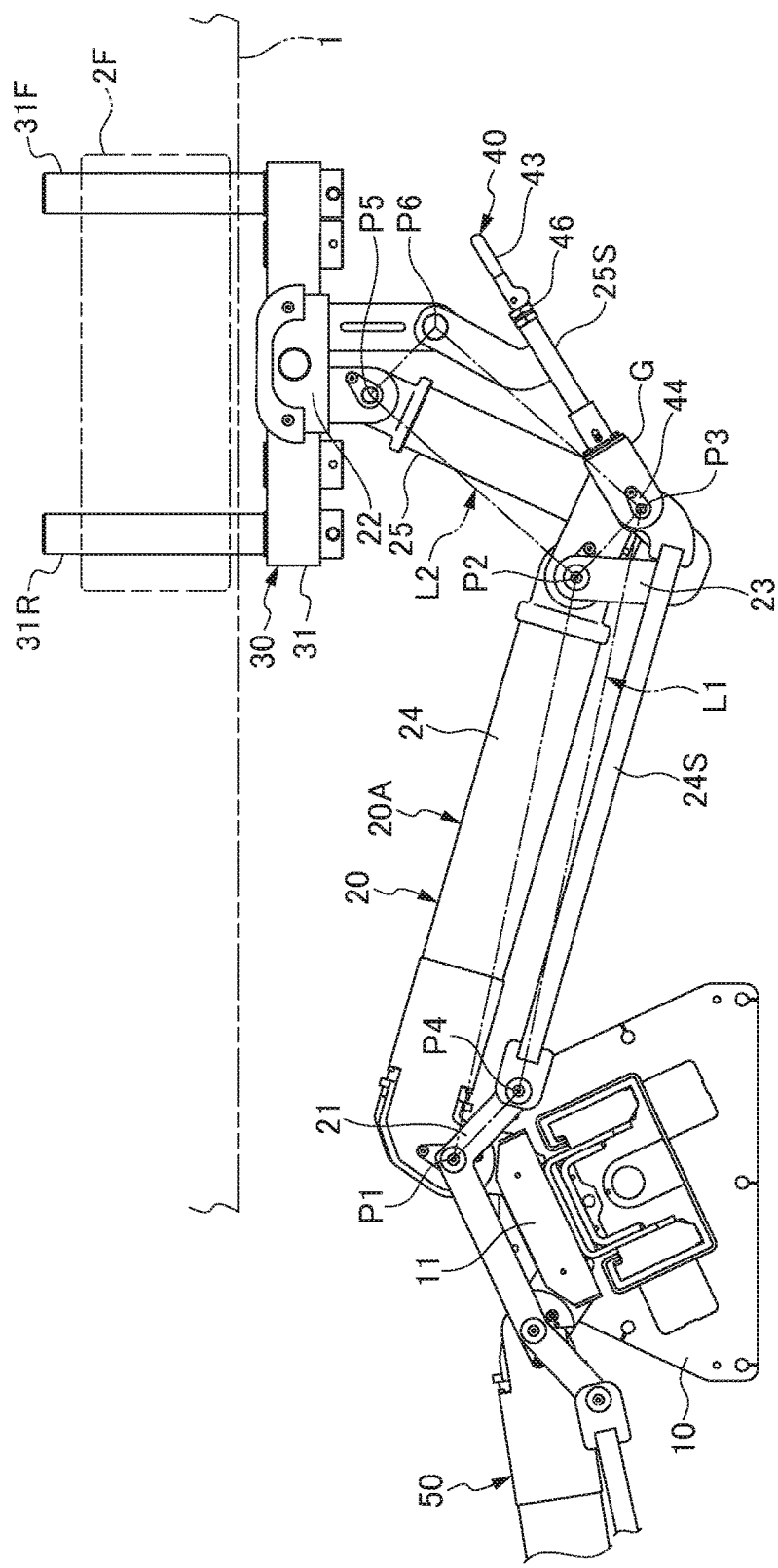
FIG. 6 is a plan view illustrating first and second parallelogram link mechanisms of the swing arm.

In addition, as illustrated in FIG. 6, in the link coupling body 20A (50A is substantially the same), the base link 21, the first link 24, the intermediate link 23, and the first sub-link 24S are connected by connecting shafts P1 to P4 to form a first parallelogram link mechanism L1, and the intermediate link 23, the second link 25, the distal link 22, and the second sub-link 25S are connected by connecting shafts P2, P5, P6, and P3 to form a second parallelogram link mechanism L2. In this instance, it is presumed that a direction of the vehicle holding tool 30 included in the distal link 22 is previously arranged to be parallel or perpendicular to the longitudinal direction of the vehicle 1 (the front-rear direction of the vehicle) stopped at the maintenance work position of the maintenance work area A.

In the link coupling body 20A (50A is substantially the same), the respective links 21 to 25, 24S, and 25S may be formed using a flat plate material or a pipe material. In the present embodiment, the first link 24, the second link 25, the first sub-link 24S, and the second sub-link 25S are formed using a round pipe material.

That is, the link coupling body 20A included in the swing arm 20 (the link coupling body 50A included in the swing arm 50 is substantially the same) is configured to have the first parallelogram link mechanism L1 and the second parallelogram link mechanism L2, the intermediate link 23 of the first parallelogram link mechanism L1 and the intermediate link 23 of the second parallelogram link mechanism L2 are in common, the base link 21 of the first parallelogram link mechanism L1 is fixed to the lifting platform 11 of the lifting frame 10, and the vehicle holding tool 30 is included in the distal link 22 of the second parallelogram link mechanism L2. In this way, irrespective of a form in which the swing arm 20 swings, the distal link 22 including in the vehicle holding tool 30 moves in parallel to the base link 21 fixed to the lifting platform 11 of the lifting frame 10 at all times. Therefore, when the direction of the vehicle holding tool 30 included in the distal link 22 is previously arranged to be parallel or perpendicular to the longitudinal direction of the vehicle (the front-rear direction of the vehicle) stopped at the maintenance work position of the maintenance work area A, the vehicle holding tool 30 is shifted only in the longitudinal direction and the vehicle width direction of the vehicle irrespective of the form in which the swing arm 20 swings.

Therefore, when the swing arm 20 is swung at a manual operating force of an operator who holds the distal link 22 of the swing arm 20 (50), the vehicle holding tool 30 is easily positioned at an appropriate position along the longitudinal direction of the vehicle, and is easily positioned at an appropriate position along the vehicle width direction of the vehicle. As a result, the front and rear levers 31F and 31R of the vehicle holding tool 30 of the swing arm 20 may be reliably and easily positioned at a holding tool insertion position slightly separated downward from a lift arrangement portion determined in a lower part of the vehicle 1 (two front and rear positions of the lower part of the tire 2F of the vehicle 1 in the present embodiment) corresponding to a lift-up start step illustrated in FIG. 2 from a standby position illustrated in FIG. 1 (FIG. 2). Thereafter, when all the four respective swing arms 20 and 50 are lifted along with the lifting platforms 11 included the right and left lifting frames 10 in a synchronized manner, the front and rear levers 31F and 31R (61F and 61R) of each vehicle holding tool 30 (60) included in each swing arm 20 (50) are allowed to come into contact with two front and rear positions corresponding to a lift arrangement portion determined in the lower part of each tire 2F (2R), and the levers 31F and 31R (61F and 61R) are positioned in the lift-up start step to interpose each tire 2F (2R) from the front and the rear.

The vehicle lift device 100 positions the vehicle holding tools 30 and 60 of the front and rear swing arms 20 and 50 supported by the respective lifting platforms 11 included in the right and left lifting frames 10 in the above-described lift-up start step (FIG. 2), and then lifts the lifting platforms 11 of the respective lifting frames 10. In this way, the swing arms 20 and 50 lifted along with the lifting platforms 11 lifts up the vehicle 1 through the vehicle holding tools 30 and 60 to reach a lift-up completed step (FIG. 3).

Therefore, the vehicle lift device 100 has the following effects.

(a) The swing arm 20 (the swing arm 50 is substantially the same) swings to assign a free trajectory to the vehicle holding tool 30 included in the distal link 22 through rotation of the plurality of links 21 to 25, 24S, and 25S included in the link coupling body 20A, and thus the vehicle holding tool 30 may be positioned at the lift arrangement portion determined in the lower part of the vehicle 1 (the two front and rear positions in the lower part of the tires 2F and 2R of the vehicle 1, or a lift point determined in the lower part of the vehicle 1). Therefore, when the swing arm 20 is swung by assigning appropriate rotation angles to the respective links 21 to 25, 24S, and 25S, the distal link 22 is shifted toward the vehicle 1, and at least links on a distal side (the distal link 22 and the intermediate link 23) except for the base link 21 in the link coupling body 20A and the vehicle holding tool 30 included in the distal link 22 may be inserted into the lower part of the vehicle 1. Alternatively, only the vehicle holding tool 30 included in the distal link 22 may be inserted into the lower part of the vehicle 1. In this way, even when the vehicle 1 has a low height and a wide width, the vehicle 1 may be lifted up by positioning the vehicle holding tool 30 at the lift arrangement portion determined in the lower part of the vehicle 1 without the base link 21 or the respective links 21 to 25, 24S, and 25S including the base link 21 touching a vehicle body.

(b) The respective links 21 to 25, 24S, and 25S included in the link coupling body 20A are pivotably supported by the connecting shafts P1 to P6, and the respective links 21 to 25, 24S, and 25S are rotated around the connecting shafts P1 to P6, thereby allowing the swing arm 20 to swing. Further, a contact area associated with rotation of the respective links 21 to 25, 24S, and 25S is small. Therefore, the swing arm 20 may be swung at a small operating force, and the vehicle holding tool 30 may be easily inserted into the lift arrangement portion determined in the lower part of the vehicle 1.

(c) In the swing arm 20, the respective links 21 to 25, 24S, and 25S are connected through the connecting shafts P1 to P6 and included in the link coupling body 20A, and one link is not stored inside a cross section of another link. In this way, certain strengths may be ensured in the respective links 21 to 25, 24S, and 25S while reducing cross section dimensions of the respective links 21 to 25, 24S, and 25S. In addition, strength against torsion may be ensured by configuring the respective links 21 to 25, 24S, and 25S using round pipes. Therefore, it is possible to attempt miniaturization of the swing arm 20 including the vehicle holding tool 30.

(d) The link coupling body 20A included in the swing arm 20 is configured to have the first parallelogram link mechanism L1 and the second parallelogram link mechanism L2, the intermediate link 23 of the first parallelogram link mechanism L1 and the intermediate link 23 of the second parallelogram link mechanism L2 are in common, the base link 21 of the first parallelogram link mechanism L1 is fixed to the lifting platform 11 of the lifting frame 10, and the vehicle holding tool 30 is included in the distal link 22 of the second parallelogram link. Therefore, irrespective of a form in which the swing arm 20 swings, the distal link 22 moves in parallel to the base link 21 fixed to the lifting platform 11 of the lifting frame 10 at all times, and the vehicle holding tool 30 included in the distal link 22 is shifted only in the longitudinal direction and the vehicle width direction of the vehicle 1. As a result, the vehicle holding tool 30 may be reliably and easily positioned at the lift arrangement portion determined in the lower part of the vehicle 1 from the outside of the vehicle 1.

(e) The distal link 22 (52) of each swing arm 20 (50) supported by the lifting platform 11 included in each of the right and left lifting frames 10 is shifted only in the longitudinal direction and the vehicle width direction of the vehicle 1. Therefore, each vehicle holding tool 30 (60) included in the distal link 22 (52) of each swing arm 20 (50) is moved in the longitudinal direction of the vehicle 1, is positioned at a side of each tire 2F (2R) determined according to a wheelbase of the vehicle 1, and then is shifted in the vehicle width direction, thereby being rapidly positioned below the two front and rear positions in the lower part of each tire 2F (2R). Thereafter, when each swing arm 20 (50) is lifted in a synchronized manner, each vehicle holding tool 30 (60) comes into contact with the two front and rear positions in the lower part of each tire 2F (2R), and is allowed to lift up the whole vehicle 1 by interposing each tire 2F (2R) from the front and the rear. Even when the vehicle 1 has a low height, the whole vehicle 1 may be easily and stably lifted up without the need to search for the lift point provided in the lower part of the vehicle 1.

The operator may easily align each vehicle holding tool 30 (60) to the two front and rear positions in the lower part of each tire 2F (2R) from a side of the vehicle 1 and easily lift up the vehicle 1 without the need to look into the dark lower part of the vehicle 1 or take a difficult operation posture in which the head is lowered in order to search for the lift point in the lower part of the vehicle 1.

(f) When the lifting frame 10 that supports each swing arm 20 (50) is fixedly installed in the maintenance work area A, a portion coming into contact with each tire 2F (2R) of each vehicle holding tool 30 (60) provided in the distal link 22 (52) of each swing arm 20 (50) may be stably set in a horizontal position. Therefore, even when a drainage slope is present on the floor of the maintenance work area A, each vehicle holding tool 30 (60) may stably lift up the whole vehicle 1 by interposing each tire 2F (2R) from the front and the rear without a concern about forward tilting along the drainage slope.

(g) When each vehicle holding tool 30 (60) included in the distal link 22 (52) of each swing arm 20 (50) is correctly shifted in the vehicle width direction, the front and rear levers 31F, 31R (61F, 61R) included in the vehicle holding tool 30 (60) may be correctly set to be parallel to two front and rear surfaces of each tire 2F (2R) and come into contact with the two front and rear surfaces, and each tire 2F (2R) may be stably interposed between the front and rear levers 31F, 31R (61F, 61R) of the vehicle holding tool 30 (60), thereby stably lifting up the whole vehicle 1.

On the other hand, when the front and rear levers 31F, 31R (61F, 61R) of each vehicle holding tool 30 (60) are set at positions obliquely crossing the two front and rear surfaces of each tire 2F (2R), only an edge portion of each tire 2F (2R) in a width direction comes into contact with each lever 31F, 31R (61F, 61R), and a length in which each tire 2F (2R) touches each lever 31F, 31R (61F, 61R) is small. Thus, there is concern that each tire 2F (2R) is unstably interposed between the front and rear levers 31F, 31R (61F, 61R), or the tire 2F (2R), a steering angle of which is not locked, rotates in a steering direction with respect to the front and rear levers 31F, 31R (61F, 61R), and each tire 2F (2R) falls off the front and rear levers 31F, 31R (61F, 61R) during lifting-up.

(h) Each vehicle holding tool 30 (60) is applicable to the tire 2F (2R) having various sizes by allowing an interval, at which the front and rear levers 31F, 31R (61F, 61R) are installed, to be variable.

(i) The vehicle holding tool 30 included in the distal link 22 of the link coupling body 20A which is included in the swing arm 20 consists of the front and rear levers 31F, 31R coming into contact with the two respective front and rear positions from below in the lower part of the tire 2F of the vehicle 1. The vehicle lift device 100 of the invention may shift the distal link 22 in the vehicle width direction from the outside of the vehicle 1 by swinging the swing arm 20. Thus, the front and rear levers 31F, 31R of the vehicle holding tool 30 included in the distal link 22 may be allowed to enter in the vehicle width direction from a side of the lower part of the tire 2F, and the two front and rear positions in the lower part of the tire 2F may be interposed between the two levers 31F, 31R, thereby performing lifting. There is no need to search for the lift point by looking into the lower part of the vehicle 1 in order to align the vehicle holding tool 30 to the lift point determined in the lower part of the vehicle 1.

Further, in the vehicle lift device 100, the link coupling body 20A included in the swing arm 20 (the link coupling body 50A included in the swing arm 50 is substantially the same) has an arm locking means 40 (70) that locks free displacement of the first parallelogram link mechanism L1 and locks free displacement of the second parallelogram link mechanism L2.

Figure 7:
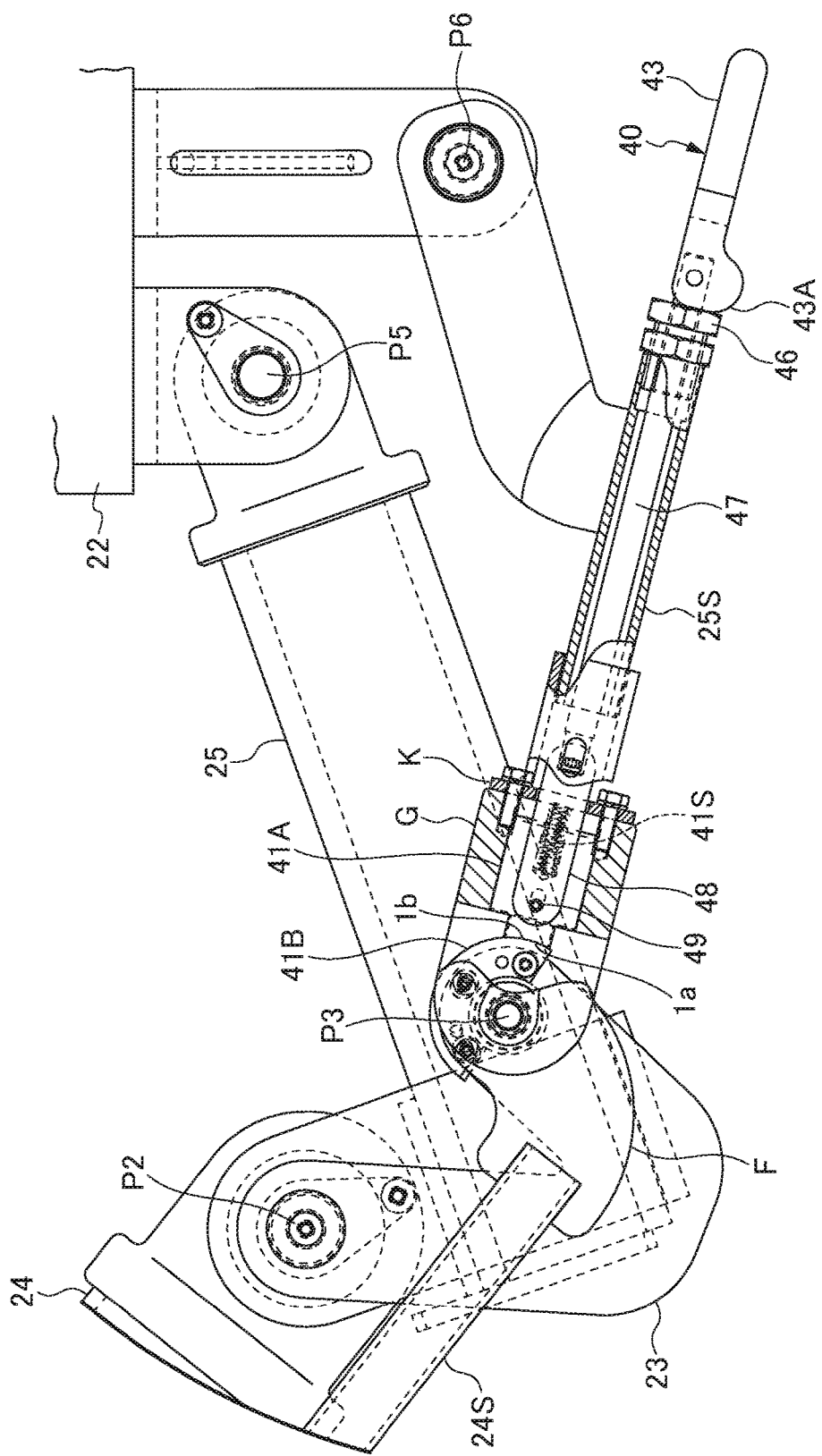
FIG. 7 is a plan view illustrating an arm locking means.
Figure 8:
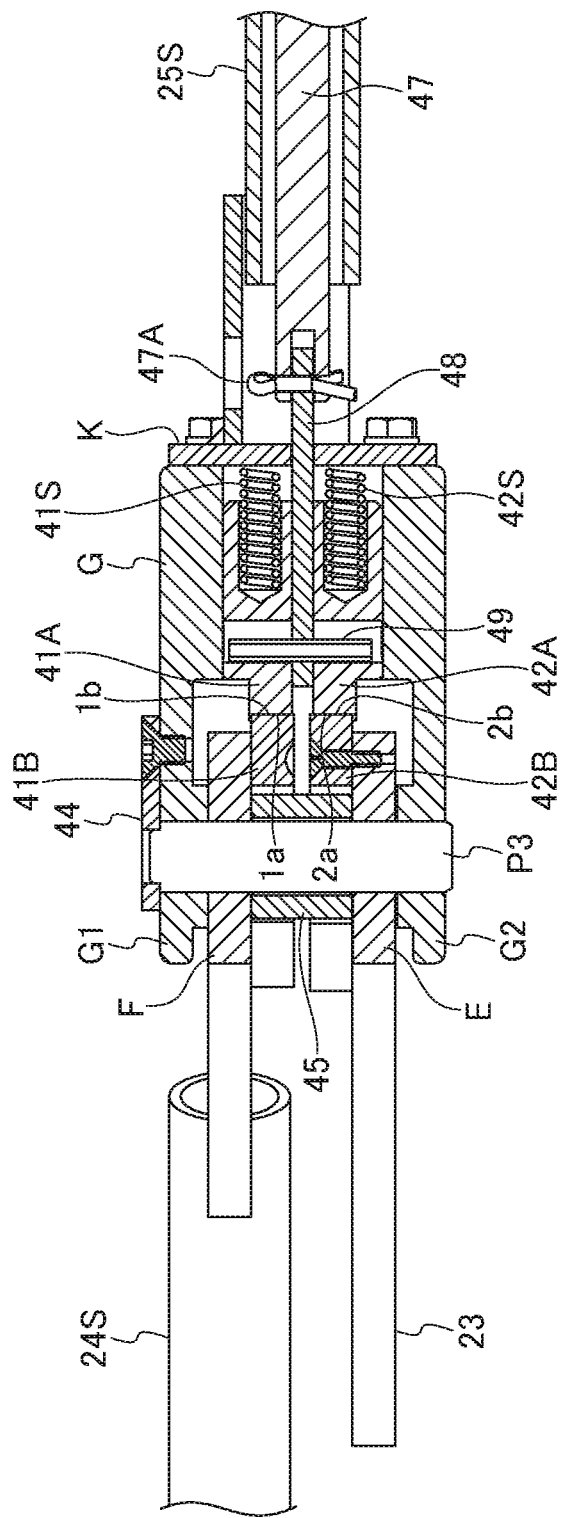
FIG. 8 is a cross-sectional view illustrating the arm locking means.
Figure 9:
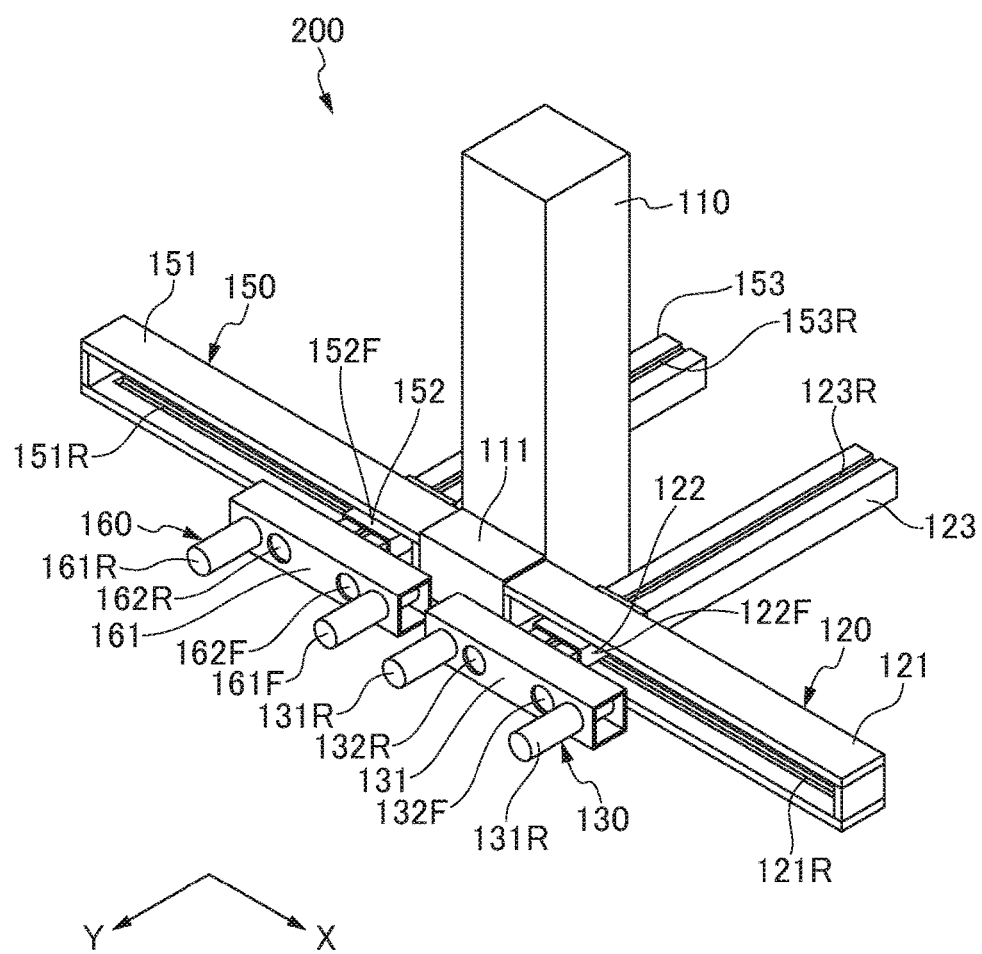
FIG. 9 is a perspective view illustrating a standby state of a vehicle lift device of a reference example.
Figure 10:
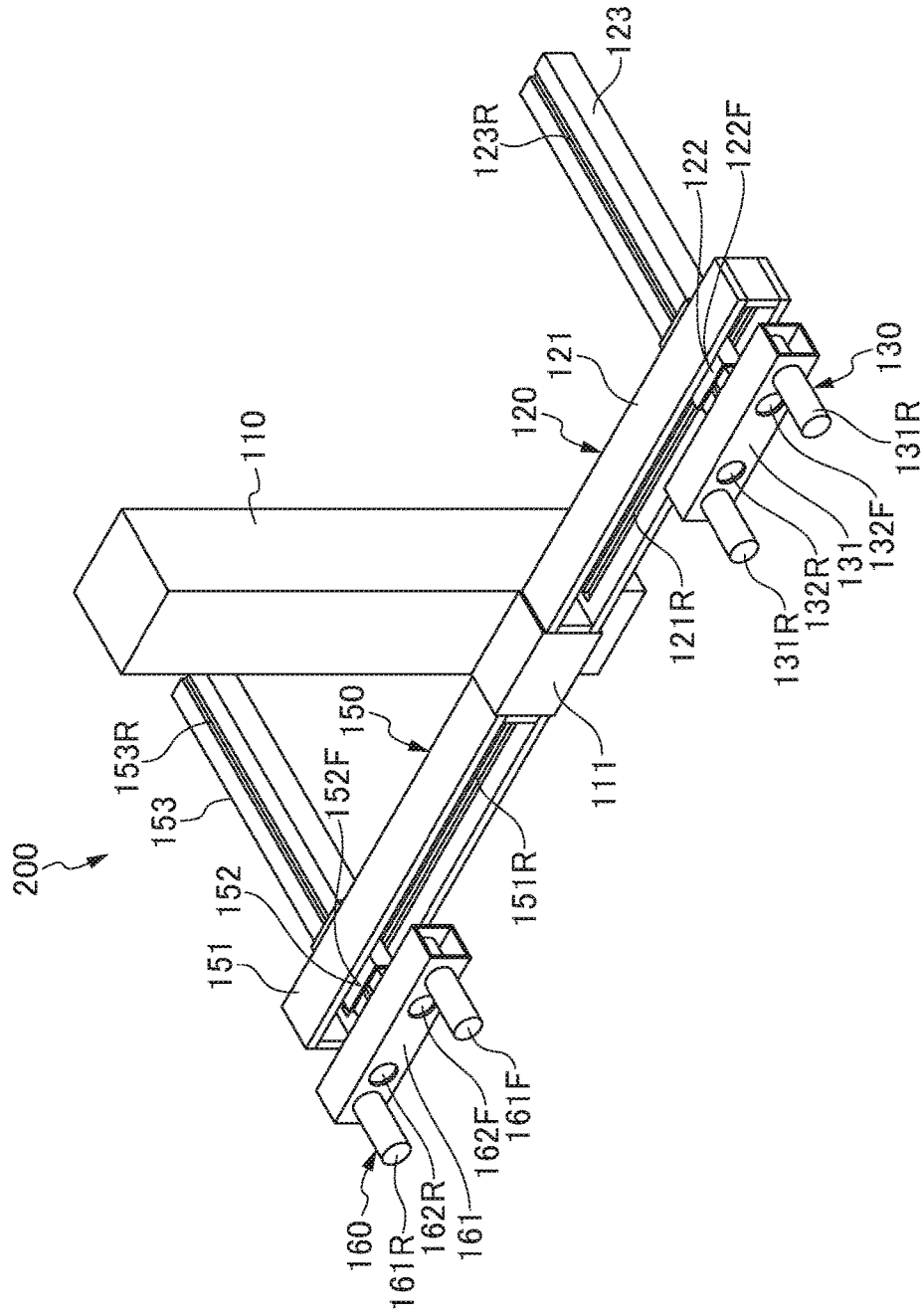
FIG. 10 is a perspective view illustrating a mobile state of the vehicle lift device along a longitudinal direction of a vehicle.
Figure 11:
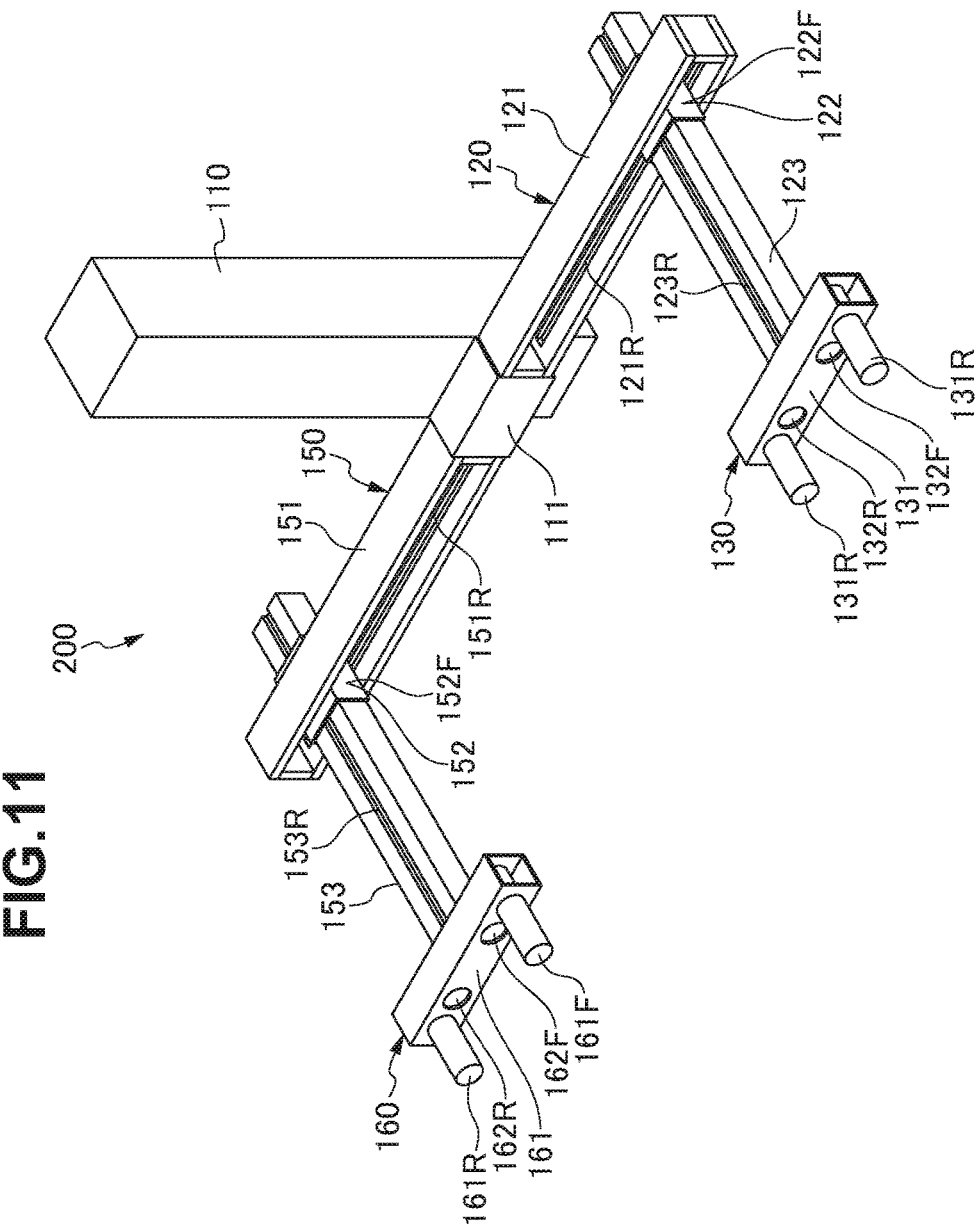
FIG. 11 is a perspective view illustrating a mobile state of the vehicle lift device along a vehicle width direction of the vehicle.
Figure 12:
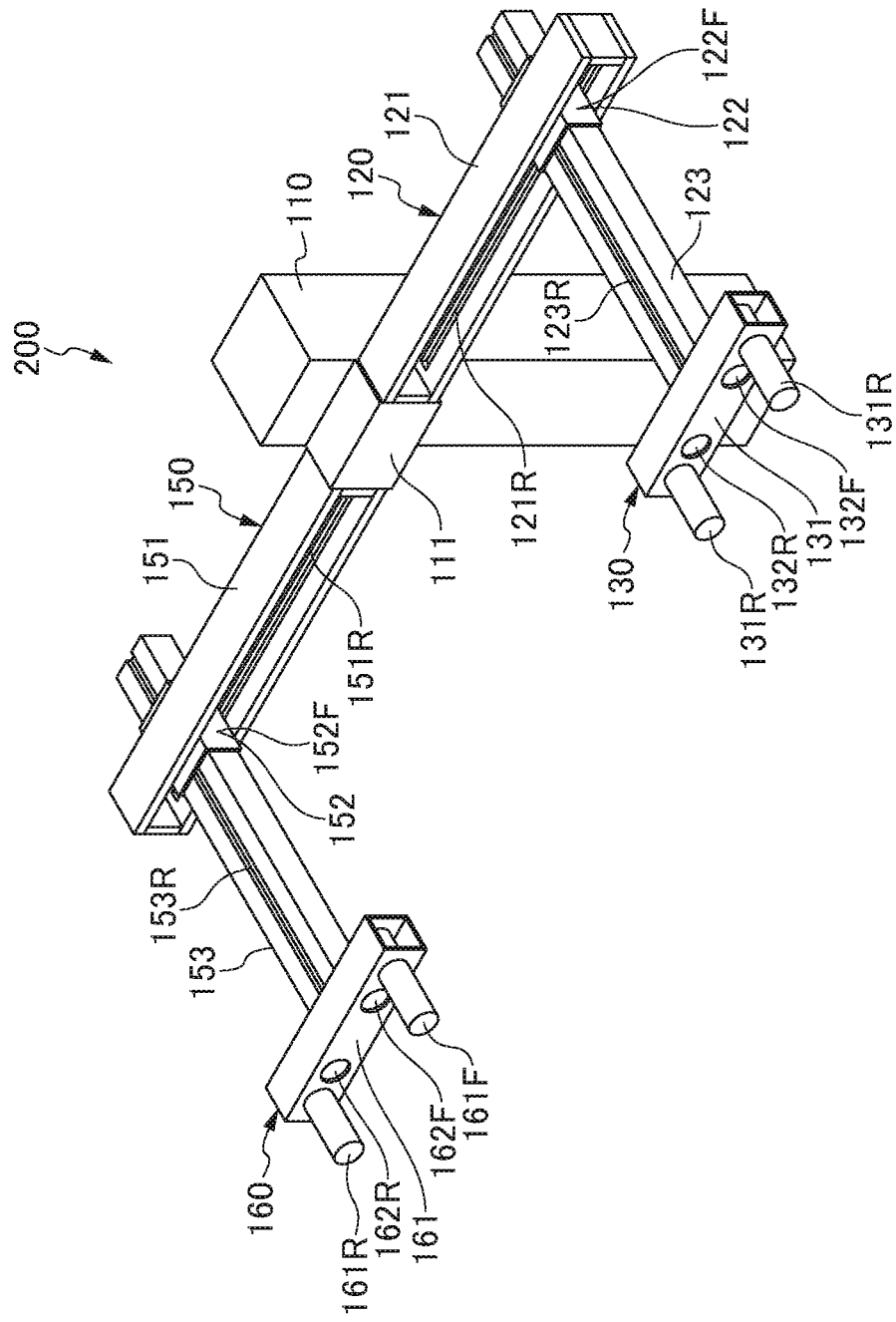
FIG. 12 is a perspective view illustrating a lift-up operation state of the vehicle lift device.

As illustrated in FIG. 7 and FIG. 8, the arm locking means 40 (70 is substantially the same) is configured by the following items i to iii.

i. A first stopping part 41A provided to be able to advance and retreat with respect to the second sub-link 25S is allowed to be engaged with a first engaging part 41B fixedly provided in the first sub-link 24S.

ii. A second stopping part 42A provided to be able to advance and retreat with respect to the second sub-link 25S is allowed to be engaged with a second engaging part 42B fixedly provided in the intermediate link 23.

iii. The first stopping part 41A is engaged with the first engaging part 41B, and the second stopping part 42A is engaged with the second engaging part 42B using a lock operation part 43 provided in the second sub-link 25S, thereby simultaneously locking free displacement of the first parallelogram link mechanism L1 and free displacement of the second parallelogram link mechanism L2.

That is, an arc-shaped external tooth 1b of the first engaging part 41B fixedly provided on an end plate F integrated with the first sub-link 24S and an arc-shaped external tooth 2b of the second engaging part 42B fixedly provided on an end plate E integrated with the intermediate link 23 are vertically arranged in parallel around a central axis of the connecting shaft P3 that connects the end plate E integrated with the intermediate link 23, the end plate F integrated with the first sub-link 24S, and an end tube G integrated with the second sub-link 25S to one another (FIG. 8). The connecting shaft P3 penetrates an upper plate G1 and a lower plate G2 of the end tube G integrated with the second sub-link 25S, the end plate E integrated with the intermediate link 23, the end plate F integrated with the first sub-link 24S, and is held by a solid body 44 screwed to the upper plate G1. Between the end plate E of the intermediate link 23 and the end plate F of the first sub-link 24S, a gap that accommodates the above-described first engaging part 41B and second engaging part 42B screwed to the end plates E, F is formed, a collar 45 inserted around the connecting shaft P3 is arranged.

In addition, the end tube G is bolted to a lid plate K welded to the second sub-link 25S, and the first stopping part 41A and the second stopping part 42A are vertically arranged in parallel and accommodated inside the end tube G. The first stopping part 41A is pressed by an elastic spring 41S supported on a rear surface of the lid plate K such that an internal tooth 1a thereof can be engaged with the corresponding external tooth 1b of the first engaging part 41B. The second stopping part 42A is pressed by an elastic spring 42S supported on the rear surface of the lid plate K such that an internal tooth 2a thereof can be engaged with the corresponding external tooth 2b of the second engaging part 42B (FIG. 8).

Whereas, in the lock operation part 43, a cam surface 43A provided in a distal portion abuts against an end surface of an end nut 46 threadably attached to an opening end of the hollow second sub-link 25S, and a pulling rod 47 pinned to the distal portion of the lock operation part 43 is inserted into a hollow portion of the second sub-link 25S. A small-diameter connection pin 49 provided in a connection plate 48 connected to an insertion end of the pulling rod 47 by a split pin 47A is engageably inserted into respective long holes provided in the above-described first stopping part 41A and second stopping part 42A vertically arranged in parallel inside the end tube G of the second sub-link 25S. When the cam surface 43A of the lock operation part 43 is positioned at a lock operation position as illustrated in FIG. 7, the respective stopping parts 41A, 42A are engaged with the respective engaging parts 41B, 42B due to a repulsive force of the elastic springs 41S, 42S to simultaneously lock free displacement of the first parallelogram link mechanism L1 and free displacement of the second parallelogram link mechanism L2. When the cam surface 43A of the lock operation part 43 is reset from the lock operation position illustrated in FIG. 7 to a lock release position by being rotated by 90 degrees on the end surface of the end nut 46, the lock operation part 43 pulls the pulling rod 47 and the connection plate 48, and the connection pin 49 provided in the connection plate 48 moves with play by a certain distance inside the long holes of the respective stopping parts 41A, 42A. Thereafter, while the elastic springs 41S, 42S are compressed, the stopping parts 41A, 42A are separated from positions at which the stopping parts 41A, 42A are engaged with the corresponding engaging parts 41B, 42B, thereby allowing the first and second parallelogram link mechanisms L1, L2 to be freely shifted.

Therefore, in addition to the above-described effects of (a) to (i), the vehicle lift device 100 has the following effects.

(j) When the vehicle holding tool 30 included in the distal link 21 of the swing arm 20 (the swing arm 50 is the same) is positioned at the holding tool insertion position below the two front and rear positions in the lower part of the tire 2F, the arm locking means 40 locks free displacements of the first parallelogram link mechanism L1 and the second parallelogram link mechanism L2. As a result, free swing of the swing arm 20 may be easily and reliably locked, and the vehicle holding tool 30 may be easily fixed to the two front and rear positions in the lower part of the tire 2F.

(k) The arm locking means 40 allows the first stopping part 41A provided to be able to advance and retreat with respect to the second sub-link 25S and the first engaging part 41B fixedly provided in the first sub-link 24S to be engaged with each other, and allows the second stopping part 42A provided to be able to advance and retreat with respect to the second sub-link 25S and the second engaging part 42B fixedly provided in the intermediate link 23 to be engaged with each other. Further, the first stopping part 41A is engaged with the first engaging part 41B, and the second stopping part 42A is engaged with the second engaging part 42B using the lock operation part 43 provided in the second sub-link 25S, thereby allowing free displacement of the first parallelogram link mechanism L1 and free displacement of the second parallelogram link mechanism L2 to be simultaneously locked. In this way, free displacements of the first parallelogram link mechanism L1 and the second parallelogram link mechanism L2 may be simultaneously locked by a compact structure irrespective of a position at which the swing arm 20 swings. In addition, free displacements of the first parallelogram link mechanism L1 and the second parallelogram link mechanism L2 may be easily and simultaneously locked through a simple operation of rotating the cam surface 43A using the single lock operation part 43.

Reference Example (FIG. 9 to FIG. 12)

A vehicle lift device 200 illustrated in FIG. 9 to FIG. 12 includes a pair of right and left lifting frames 110 and 110 installed on right and left sides of a maintenance work area A which includes a maintenance work position at which a vehicle subjected to maintenance 1 (not illustrated) is introduced and stopped. FIG. 1 to FIG. 4 illustrate only one lifting frame 110 installed on the right side of the maintenance work area A.

Each lifting frame 110 is fixedly vertically arranged on a floor of the maintenance work area A by an anchor bolt, etc. implanted in the floor, and includes a lifting platform 111 which is lifted and lowered by having a driving means (a hydraulic cylinder, an electric motor, etc.) (not illustrated). Note that a direction along a vehicle width direction perpendicular to a front-rear direction of the vehicle 1, which is introduced and stopped at the maintenance work position of the maintenance work area A, is set to a left-right direction.

The vehicle lift device 200 includes a pair of front and rear sliding arms 120 and 150 supported at two front and rear positions of the lifting platform 111 which is included in each lifting frame 110. Each of the sliding arms 120 and 150 can be lifted and lowered along with the lifting platform 111 when the lifting platform 111 is lifted and lowered. Note that a direction along a vehicle longitudinal direction along the front-rear direction of the vehicle 1, which is introduced and stopped at the maintenance work position of the maintenance work area A, is set to a front-rear direction.

Each of the sliding arms 120 and 150 consists of a proximal sliding guide 121 (151) fixed to the lifting platform 111 of the lifting frame 110, an intermediate sliding body 122 (152) supported movably in an X-axis direction along the longitudinal direction of the vehicle 1 by the proximal sliding guide 121 (151), and a distal sliding body 123 (153) supported movably in a Y-axis direction along the vehicle width direction of the vehicle 1 by the intermediate sliding body 122 (152).

In the present reference example, the proximal sliding guide 121 (151) has a beam shape which extends in the X-axis direction while one end portion is fixed to a front end surface (rear end surface) of the lifting platform 111 and has the other end portion set to a free end, and includes upper and lower guide rails 121R (151R) arranged along the X-axis direction.

The intermediate sliding body 122 (152) consists of a square pipe-shaped slide frame 122F (152F), and is guided movably in the X-axis direction by the guide rails 121R (151R) of the proximal sliding guide 121 (151).

The distal sliding body 123 (153) has a beam shape into which the outside of the square pipe-shaped slide frame 122F (152F) of the intermediate sliding body 122 (152) is inserted in a penetrated manner, and includes upper and lower guided rails 123R (153R) arranged along the Y-axis direction. The upper and lower guided rails 123R (153R) are guided movably in the Y-axis direction by guide portions (not illustrated) provided on upper and lower inner surfaces of the square pipe-shaped slide frame 122F (152F).

In addition, each sliding arm 120 (150) includes a vehicle holding tool 130 (160) on a distal end surface of the distal sliding body 123 (153) facing the maintenance work area A.

The vehicle holding tool 130 (160) consists of a mounting bracket 131 (161) fixed to the distal end surface of the distal sliding body 123 (153), and front and rear levers 131F, 131R (161F, 161F) inserted into and fixed to mounting holes provided in the mounting bracket 131 (161). The front and rear levers 131F, 131R (161F, 161F) consist of straight bar bodies having circular cross sections, and come into contact with two respective front and rear positions in a lower part (lower half portion) of a front tire 2F (a rear tire 2R) of the vehicle 1 from below. The mounting bracket 131 (161) has two or more mounting holes 132F (162F) for the front lever 131F (the front lever 161F) and two or more mounting holes 132R (162R) for the rear lever 131R (the rear lever 161R) in order to allow insertion positions of the levers 131F, 131R (161F, 161F) to be selected according to a tire diameter of the vehicle 1.

Therefore, according to the vehicle lift device 200, the vehicle holding tool 130 (160) is moved in the longitudinal direction of the vehicle 1 by movement of the intermediate sliding body 122 (152), and is positioned at a side of each tire 2F (2R) determined according to a wheelbase of the vehicle 1. Subsequently, the vehicle holding tool 130 (160) is shifted in the vehicle width direction of the vehicle 1 by movement of the distal sliding body 123 (153), thereby being rapidly positioned below the two front and rear positions in the lower part of each tire 2F (2R). Thereafter, when each sliding arm 120 (150) is lifted in a synchronized manner, each vehicle holding tool 130 (160) may come into contact with the two front and rear positions in the lower part of each tire 2F (2R), and interpose each tire 2F (2R) from the front and the rear, thereby lifting up the whole vehicle 1.

In this way, the vehicle lift device 200 may obtain the same effects as the above-described items (e) to (h) in the vehicle lift device 100, and may easily lift up the vehicle 1 using the vehicle holding tool 130 (160).

As heretofore explained, embodiments of the present invention have been described in detail with reference to the drawings. However, the specific configurations of the present invention are not limited to the illustrated embodiments but those having a modification of the design within the range of the presently claimed invention are also included in the present invention. For example, in the vehicle lift device 100 of the invention, the vehicle holding tool 30 (60) included in the distal link 22 (52) of the link coupling body 20A (50A) which is included in the swing arm 20 (50) may have a bracket coming into contact with the lift point determined in the lower part of the vehicle 1 from below. In the vehicle lift device 100 of the invention, even when the vehicle has a low height and a wide width, the vehicle holding tool 30 (60) may be positioned by being inserted into the lower part of the vehicle 1, and thus the bracket of the vehicle holding tool 30 (60) may be reliably and easily positioned at the lift point in the lower part of the vehicle 1, thereby performing lifting.

In addition, in the invention, the link coupling body included in the swing arm may not consist of the parallelogram link mechanism.

In addition, in the invention, the link coupling body included in the swing arm may have another arm locking means other than the arm locking means that locks the parallelogram link mechanism.

INDUSTRIAL APPLICABILITY

The invention may provide a vehicle lift device capable of easily inserting a vehicle holding tool into a lower part of a low floor vehicle with a small operating force. In addition, in the vehicle lift device, a swing arm including the vehicle holding tool may be miniaturized. Further, in the vehicle lift device, the swing arm including the vehicle holding tool may be easily and reliably locked. Furthermore, a vehicle may be easily lifted up using the vehicle holding tool.

REFERENCE SIGNS LIST 1 vehicle
2F, 2R tire
10 lifting frame
11 lifting platform
20, 50 swing arm
20A, 50A link coupling body
21, 51 base link
22, 52 distal link
23, 53 intermediate link
24, 54 first link
25, 55 second link
24S, 54S first sub-link
25S, 55S second sub-link
30, 60 vehicle holding tool
31F, 31R, 61F, 61R front and rear lever
40, 70 arm locking means
41A first stopping part
41B first engaging part
42A second stopping part
42B second engaging part
43 lock operation part
100 vehicle lift device
L1 first parallelogram link mechanism
L2 second parallelogram link mechanism

What is claimed is:

1. A vehicle lift device comprising:
a pair of right and left lifting frames installed on right and left sides of a maintenance work area of a vehicle to be serviced; and
a pair of front and rear swing arms supported at two respective front and rear positions of a lifting platform included in each of the lifting frames, and allowed to be lifted and lowered along with the lifting platform,
wherein each of the swing arms includes a link coupling body obtained by connecting a plurality of links, a base link included in the link coupling body is fixed to the lifting platform of the lifting frame, and a distal link included in the link coupling body includes a vehicle holding tool,
the link coupling body includes seven links corresponding to a base link, a distal link, an intermediate link, a first link, a second link, a first sub-link, and a second sub-link, lengths of respective links corresponding to the base link, the distal link, and the intermediate link are identical to one another, lengths of respective links corresponding to the first link and the first sub-link are identical to each other, and lengths of respective links corresponding to the second link and the second sub-link are identical to each other, and
the base link, the first link, the intermediate link, and the first sub-link are connected to form a first parallelogram link mechanism, and the intermediate link, the second link, the distal link, and the second sub-link are connected to form a second parallelogram link mechanism.

2. The vehicle lift device according to claim 1, wherein the link coupling body includes an arm locking means that simultaneously locks free displacement of the first parallelogram link mechanism and free displacement of the second parallelogram link mechanism.

3. The vehicle lift device according to claim 2,
wherein the arm locking means:
allows a first stopping part provided to be able to advance and retreat with respect to the second sub-link to be engaged with a first engaging part fixedly provided in the first sub-link; and
allows a second stopping part provided to be able to advance and retreat with respect to the second sub-link to be engaged with a second engaging part fixedly provided in the intermediate link, and
wherein the first stopping part is engaged with the first engaging part, and the second stopping part is engaged with the second engaging part by a lock operation part provided in the second sub-link, thereby allowing the free displacement of the first parallelogram link mechanism and the free displacement of the second parallelogram link mechanism to be simultaneously locked.

4. The vehicle lift device according to claim 3,
wherein the distal link of the link coupling body is allowed to be shifted only in a longitudinal direction and a vehicle width direction of the vehicle,
the distal link includes the vehicle holding tool positioned with respect to a lift arrangement portion corresponding to two front and rear positions in a lower part of a tire of a vehicle by being put in the lower part of the tire from a side of the lower part of the tire when the distal link is shifted in the vehicle width direction from an outside of the vehicle, and the vehicle holding tool positioned with respect to the lift arrangement portion is allowed to lift up the vehicle by coming into contact with the two respective front and rear positions in the lower part of the tire from below along with lifting of the lifting platform of the lifting frame.

5. The vehicle lift device according to claim 3,
wherein the vehicle holding tool included in the distal link of the link coupling body includes front and rear levers positioned with respect to a lift arrangement portion corresponding to two front and rear positions in a lower part of a tire of a vehicle by being put in the lower part of the tire from a side of the lower part of the tire when the distal link is shifted in the vehicle width direction from an outside of the vehicle, and
the front and rear levers positioned with respect to the lift arrangement portion are allowed to lift up the vehicle by coming into contact with the two respective front and rear positions in the lower part of the tire from below along with lifting of the lifting platform of the lifting frame.

6. The vehicle lift device according to claim 3, wherein the vehicle holding tool included in the distal link of the link coupling body includes a bracket coming into contact with a lift point determined in the lower part of the vehicle from below by being put in the lower part of the vehicle from a side of the lower part of the vehicle.

7. The vehicle lift device according to claim 2,
wherein the distal link of the link coupling body is allowed to be shifted only in a longitudinal direction and a vehicle width direction of the vehicle,
the distal link includes the vehicle holding tool positioned with respect to a lift arrangement portion corresponding to two front and rear positions in a lower part of a tire of a vehicle by being put in the lower part of the tire from a side of the lower part of the tire when the distal link is shifted in the vehicle width direction from an outside of the vehicle, and
the vehicle holding tool positioned with respect to the lift arrangement portion is allowed to lift up the vehicle by coming into contact with the two respective front and rear positions in the lower part of the tire from below along with lifting of the lifting platform of the lifting frame.

8. The vehicle lift device according to claim 2,
wherein the vehicle holding tool included in the distal link of the link coupling body includes front and rear levers positioned with respect to a lift arrangement portion corresponding to two front and rear positions in a lower part of a tire of a vehicle by being put in the lower part of the tire from a side of the lower part of the tire when the distal link is shifted in the vehicle width direction from an outside of the vehicle, and
the front and rear levers positioned with respect to the lift arrangement portion are allowed to lift up the vehicle by coming into contact with the two respective front and rear positions in the lower part of the tire from below along with lifting of the lifting platform of the lifting frame.

9. The vehicle lift device according to claim 2, wherein the vehicle holding tool included in the distal link of the link coupling body includes a bracket coming into contact with a lift point determined in the lower part of the vehicle from below by being put in the lower part of the vehicle from a side of the lower part of the vehicle.

10. The vehicle lift device according to claim 1,
wherein the distal link of the link coupling body is allowed to be shifted only in a longitudinal direction and a vehicle width direction of the vehicle,
the distal link includes the vehicle holding tool positioned with respect to a lift arrangement portion corresponding to two front and rear positions in a lower part of a tire of a vehicle by being put in the lower part of the tire from a side of the lower part of the tire when the distal link is shifted in the vehicle width direction from an outside of the vehicle, and
the vehicle holding tool positioned with respect to the lift arrangement portion is allowed to lift up the vehicle by coming into contact with the two respective front and rear positions in the lower part of the tire from below along with lifting of the lifting platform of the lifting frame.

11. The vehicle lift device according to claim 10,
wherein the vehicle holding tool included in the distal link of the link coupling body includes front and rear levers positioned with respect to a lift arrangement portion corresponding to two front and rear positions in a lower part of a tire of a vehicle by being put in the lower part of the tire from a side of the lower part of the tire when the distal link is shifted in the vehicle width direction from an outside of the vehicle, and
the front and rear levers positioned with respect to the lift arrangement portion are allowed to lift up the vehicle by coming into contact with the two respective front and rear positions in the lower part of the tire from below along with lifting of the lifting platform of the lifting frame.

12. The vehicle lift device according to claim 1,
wherein the vehicle holding tool included in the distal link of the link coupling body includes front and rear levers positioned with respect to a lift arrangement portion corresponding to two front and rear positions in a lower part of a tire of a vehicle by being put in the lower part of the tire from a side of the lower part of the tire when the distal link is shifted in the vehicle width direction from an outside of the vehicle, and
the front and rear levers positioned with respect to the lift arrangement portion are allowed to lift up the vehicle by coming into contact with the two respective front and rear positions in the lower part of the tire from below along with lifting of the lifting platform of the lifting frame.

13. The vehicle lift device according to claim 1, wherein the vehicle holding tool included in the distal link of the link coupling body includes a bracket coming into contact with a lift point determined in the lower part of the vehicle from below by being put in the lower part of the vehicle from a side of the lower part of the vehicle.

* * * * *